US007606485B2

(12) United States Patent
Ohashi (10) Patent No.: US 7,606,485 B2
(45) Date of Patent: Oct. 20, 2009

(54) STEREO IMAGER

(75) Inventor: Masahito Ohashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 99 days.

(21) Appl. No.: 11/063,603

(22) Filed: Feb. 24, 2005

(65) Prior Publication Data
US 2005/0185050 A1 Aug. 25, 2005

(51) Int. Cl.
  G03B 35/00 (2006.01)
  H04N 13/02 (2006.01)
(52) U.S. Cl. .................. 396/326; 396/327; 396/331; 348/49
(58) Field of Classification Search .......... 396/322, 396/324, 326, 327, 331; 348/42, 49
See application file for complete search history.

(56) References Cited

U.S. PATENT DOCUMENTS

| 1,871,281 | A | * | 8/1932 | Savage | 359/618 |
| 3,815,970 | A | * | 6/1974 | Murphy | 359/462 |
| 6,363,225 | B1 | * | 3/2002 | Sugawara | 396/331 |
| 6,603,876 | B1 | * | 8/2003 | Matsuo et al. | 382/154 |
| 2003/0133707 | A1 | * | 7/2003 | Perisic | 396/324 |

FOREIGN PATENT DOCUMENTS

JP 08-171151 7/1996

OTHER PUBLICATIONS

Doherty, Paul; "Ray Tracing". Jun. 14, 2000. Website: http://www.exo.net/~pauld/summer_institute/summer_day7images/RayTracing.html.*

* cited by examiner

Primary Examiner—Rochelle-Ann J Blackman
(74) Attorney, Agent, or Firm—Kenyon & Kenyon LLP (57) ABSTRACT

The invention relates to a stereo imager that is reduced in the number of members, favorable in view of cost and less susceptible to variations from optical system to optical system. The stereo imager comprises a single image pickup device 4 and a stereo imaging optical system including bending member 21L, 21R, 22L and 22R for bending parallactic light beams from a subject and adapted to form on the single image pickup device 4 at least two parallactic images having mutual parallaxes. The stereo imaging optical system comprises at least one optical member 3 located in front of the single image pickup device 4 and adapted to receive light beams forming at least two parallactic images and have the same optical action or function with respect to each light beam.

11 Claims, 10 Drawing Sheets

STEREO IMAGER

This application claims benefit of Japanese Application No. 2004-49526 filed in Japan on Feb. 25, 2004, the contents of which are incorporated by this reference.

BACKGROUND OF THE INVENTION

The present invention relates generally to a stereo imager, and more particularly to a stereo imager capable of taking stereo images on a small-format and single image pickup device.

A camera capable of real-time taking two images having parallaxes juxtaposed in the left-and-right direction for the same subject has so far been known in the art. Since an oblong image pickup plane is usually used for taking, it is general that two images are arranged side by side in the left-and-right direction. However, when it is desired to obtain horizontally long stereo images with such a taking arrangement, two horizontally long images must be arranged in the horizontal direction, resulting in a useless space on the image pickup plane. For instance, when two such images are simultaneously picked up by means of a single image pickup device for range finding or the like, it is difficult to obtain detailed image information.

To solve such a problem, patent publication 1 comes up with a stereo taking optical system for capturing stereo images on an oblong image pickup plane in the vertical direction.

In this optical system, a film plane is vertically divided into upper and lower areas, as shown in FIGS. 1 and 2 of patent publication 1, and left and right images having parallaxes are guided to the upper and lower areas of the film plane by ways of two reflecting surfaces for each.

Patent Publication 1

JP(A)8-171151

However, the taking optical system or the like set forth in patent publication 1 comprises optical systems having at least two different entrance positions, and so is not preferable because control of each optical system requires more members and variations are likely to occur from optical system to optical system.

With such problems with the prior art as described above in mind, one object of the invention is to provide a stereo imager that is reduced in the number of members, favorable in view of cost and less susceptible to variations from optical system to optical system.

SUMMARY OF THE INVENTION

Referring first to the term "parallactic direction" used herein before giving a detailed explanation of the invention, that term means a direction of connecting the position of a center ray incident from the same subject on the entrance surface of the first objective lens group with the position of a center ray incident on the entrance surface of the second objective lens group. Usually, a horizontal (left-and-right) direction is chosen in the invention; however, that parallactic direction is not always limited thereto, and so could be selected from any desired vertical or oblique directions. For a parallactic image on the image pickup device (an image-formation plane), a relative misalignment direction of the same subject on a plurality of parallax images is defined as that parallax direction.

The term "single image pickup device" used herein means one that has not only one single receiving plane but also a plurality of juxtaposed receiving planes on the same substrate (of usually a semiconductor material).

It is here noted that not only two or left and right parallactic images but also three or more parallactic images may be guided to the single image pickup device. In this case, sets of objective lens groups corresponding to that number are needed.

According to the first aspect of the invention, there is provided a stereo imager comprising a single image pickup device and a stereo imaging optical system including a bending member for bending a parallactic light beam from a subject and adapted to form on said single image pickup device at least two, mutually parallactic images, characterized in that:

said stereo imaging optical system comprises an optical member located in front of said single image pickup device, wherein said optical member receives light beams forming said at least two parallactic images and has the same optical action or function with respect to each light beam.

The advantages of, and the requirements for, the first stereo imager are now explained. The light beams from the subject having right and left parallaxes (that, unless otherwise state, will stand for the parallactic direction) enters the stereo imaging optical system in the stereo imager according to the invention, where they are subjected to optical action for image formation, so that images having parallaxes (parallactic images) can be guided onto the single image pickup device by way of the bending member that make use of the reflection or so-called prism effect (on bending of the whole light beam by refraction) of at least one independent reflecting surface, mirror, prism or the like.

If, in this case, the image pickup device is used as a common member, the number of parts involved can then be reduced, leading to decreases in the size and weight of the imaging system.

Furthermore, if at least one optical member having the same optical action or function with respect to each light beam is interposed between the bending member and the single image pickup device, further size and weight reductions are then achievable with a much more enhanced performance.

According to the second aspect of the invention, there is provided a stereo imager comprising a single image pickup device and a stereo imaging optical system adapted to form on said single image pickup device at least two, mutually parallactic images, characterized in that:

said stereo imaging optical system comprises an optical member located in front of said single image pickup device, wherein said optical member receives said light beams forming at least two parallactic images and has the same optical action or function with respect to each light beams, so that state changes are induced in said imaging optical system by the same optical action or function.

The advantages of, and the requirements for, the second stereo imager are now explained. The light beams from the subject having right and left parallaxes (that, unless otherwise state, will stand for the parallactic direction) enters the stereo imaging optical system in the stereo imager according to the invention, where they are subjected to optical action for image formation, so that images having parallaxes (parallactic images) can be guided onto the single image pickup device by way of the bending member that makes use of the reflection or so-called prism effect (on bending of the whole light beam by refraction) of at least one independent reflecting surface, mirror, prism or the like.

If, in this case, the image pickup device is used as a common member, the number of parts involved can then be reduced, leading to reductions of the size and weight of the imaging system.

Furthermore, if at least one optical member having the same optical action or function that induces state changes in the stereo optical system for each light beam is interposed between the bending means and the single image pickup device, not only are further size and weight reductions of the stereo imager achievable but also the state changes remain constant irrespective of independent changing of the light beams having right and left parallaxes, resulting in enhancement of the precision of such state changes. In addition, the means for regulating differences in changes between the right and left light beams can be simplified or dispensed with, so that the size and weight of the imaging system can be much more reduced.

According to the third aspect of the invention, the stereo imager of the above $1^{st}$ or $2^{nd}$ aspect is further characterized in that said stereo imaging optical system is constructed such that said at least two parallactic images to be projected onto said single image pickup device are projected in juxtaposition in a direction different from the parallactic directions thereof.

The advantages of, and the requirements for, the third stereo imager are now explained.

With the stereo imager set up as defined above, the light beams having right and left parallaxes form images in a generally vertical direction of the image pickup device by way of each bending member, so that if the image pickup device is positioned in conformity with the contours of the juxtaposed right and left parallactic images, it is then possible to obtain a wide-angle image in the right-and-left direction.

It is here to be understood that given that the parallactic direction is defined as the right-and-left direction, the direction different from the parallactic direction is not limited to the vertical direction, and includes an oblique direction.

According to the fourth aspect of the invention, the above $1^{st}$ or $2^{nd}$ stereo imager is further characterized in that:

said stereo imaging optical system comprises:

a first entrance window and a second entrance window juxtaposed in a right-and-left direction with entrances surfaces thereof facing a subject side, and a plurality of reflecting surfaces for guiding a light beam incident on said first entrance window to said single image pickup device and a plurality of reflecting surfaces for guiding a light beam incident on said second entrance window to said single image pickup device, wherein said optical member is interposed between said plurality of reflecting surfaces and said single image pickup device.

The advantage of the $4^{th}$ stereo imager is now explained. With the stereo imager assembled as defined above, high assembling efficiency is achievable while an increase in the number of lens surfaces is held back.

According to the fifth aspect of the invention, the above $2^{nd}$ stereo imager is further characterized in that:

said stereo imaging optical system includes a first entrance window and a second entrance window juxtaposed in a right-and-left direction with entrances surfaces thereof facing a subject side, and comprises, in order from said first entrance window, an objective lens group having positive refracting power, a primary image-formation plane formed by said objective lens group and a relay lens group having positive refracting power and, in order from said second entrance window, an objective lens group having positive refracting power, a primary image-formation plane formed by said objective lens group and a relay lens group having positive refracting power, wherein at least a part of said relay lens groups having positive refracting power is provided as a common optical system.

The advantages of, and the requirements for, the above $5^{th}$ stereo imager are now explained.

The incorporation of the relay optical systems enables the objective lens groups to be provided in a wide-angle form, lens diameter to become small and an ample space for the bending member to be assured while the performance of the imaging optical system is kept intact. In addition, if at least a part of the relay lens groups is provided as a common optical system, the size, weight and cost of the imaging system are reduced with a simplified structure. In one embodiment of this aspect, the common optical system may be designed in such a way as to change in state.

According to the sixth aspect of the invention, the above $1^{st}$ or $2^{nd}$ stereo imager is further characterized:

said stereo imaging optical system includes a first entrance window and a second entrance window juxtaposed in a right-and-left direction with entrances surfaces thereof facing a subject side, and comprises, in order from said first entrance window, an objective lens group having positive refracting power, a primary image-formation plane formed by said objective lens group and a relay lens group having positive refracting power and, in order from said second entrance window, an objective lens group having positive refracting power, a primary image-formation plane formed by said objective lens group and a relay lens group having positive refracting power, wherein said optical member is interposed between a part of said relay lens groups and said single image pickup device.

The advantage of the above $6^{th}$ stereo imager is now explained.

The optical member, if interposed between the bending means and the image pickup device, may be located in the relay lens groups.

According to the seventh aspect of the invention, the above $2^{nd}$ stereo imager is further characterized in that said stereo imaging optical system comprises:

an image-formation lens group of positive refracting power, on which said light beams forming at least two parallactic images are incident and which has only one optical axis, a first objective lens group and a second objective lens group, each of negative refracting power, which are juxtaposed at a spacing in a parallactic direction with entrance surfaces thereof facing a subject side, and a first light-guidance optical system including a $1\text{-}1^{st}$ reflecting surface and a $1\text{-}2^{nd}$ reflecting surface for guiding a light beam incident from the subject through said first objective lens group to said image-formation lens group, and a second light-guidance optical system including a $2\text{-}1^{st}$ reflecting surface and a $2\text{-}2^{nd}$ reflecting surface for guiding a light beam incident from the subject through said second objective lens group to said image-formation lens group, wherein said optical member is formed by said image-formation lens group of positive refracting power.

The advantage of the above $7^{th}$ stereo imager is now explained.

The optical member, if interposed between the bending means and the image pickup device, may be located in the image-formation lens group.

In addition, if at least a part of the image-formation optical system is allowed to be movable to induce optical state changes, then more efficient assembly is achievable.

According to the eighth aspect of the invention, any one of the above $1^{st}$ to $5^{th}$ stereo imagers is further characterized in that said optical means comprises a positive lens group.

The advantage of the above 8th stereo imager is now explained.

The incidence of a light beam on the image pickup device in an almost nearly vertical state is useful for prevention of shadings. The location of that optical action at or near the image pickup device permits the whole imager to become compact, and the common use of parts enables cost reductions to be achieved.

According to the ninth aspect of the invention, any one of the above 1st to 7th stereo imagers is further characterized in that said optical means comprises a light-quantity control filter.

The requirement for the above 9th stereo imager is now explained. It is desired that the light-quantity control filter (ND filter) give the same brightness to at least two optical systems that form together the stereo optical system. The use of the same light-quantity control filter is preferred because of no need of taking care of variations in the light-quantity control filter in each optical system.

It is here noted that the light-quantity control filter may be adapted for insertion in, or deinsertion from, the optical path. Preferably, variations in the reflectivity, etc. of the reflecting surfaces of two or more optical systems that form together the stereo optical system should be controlled by means of the filter inserted in each optical system or electrical correction, and the brightness of a subject or the like should be controlled by that light-quantity control filter.

The light-quantity control filter may be used in combination with replaceable filters with varying densities.

Alternatively, the light-quantity control filter could have electrically variable densities.

According to the tenth aspect of the invention, any one of the above 1st to 7th stereo imagers is further characterized in that said optical means comprises an aperture stop.

According to the eleventh aspect of the invention, the above 10th stereo imager is further characterized in that a positive lens group is interposed between said aperture stop and said image pickup device.

The advantages of the 10th and 11th stereo imagers are now explained.

Each of these systems is preferred because of no variation in the diameter of the aperture stop.

According to the twelfth aspect of the invention, any one of the above 1st to 7th stereo imagers is further characterized in that said optical member is a focusing member.

This arrangement for the 12th stereo imager is preferred because of no variation in focusing, and because one driving system can suffice.

The focusing member may comprise a lens group having positive or negative refracting power, i.e., a finite focal length. In this case, focusing is carried out by changing the distance between that lens group and the image pickup device.

Alternatively, the focusing member may comprise one set of opposite wedge-like prisms. In this case, focusing is carried out by changing the relative positions of one set of opposite wedge-like prisms thereby changing the transmission distance of a light beam therethrough.

The focusing member may also serve as a mechanism for changing the stereo imaging optical system and the single image pickup device. In this case, focusing is carried out by changing that distance.

According to the thirteenth aspect of the invention, any one of the 1st to 7th stereo imagers is further characterized in that said optical means is a zooming member.

The advantage of the above 13th stereo imager is now explained. This arrangement for the 13th stereo imager is preferred because of no variation in zooming, and because one driving system can suffice.

The zooming member may comprise a lens group having positive or negative refracting power, i.e., a finite focal length. In this case, zooming is carried out by changing the distance between that lens group and the image pickup device.

Alternatively, the zooming member may comprise a plurality of lens groups having positive or negative refracting power, i.e., a finite focal length. In this case, zooming is carried out by changing the relative distances of the plurality of lens groups along the optical axes thereof.

According to the inventive stereo imager wherein the image pickup device is used as a common member, the number of parts involved can be reduced, leading to size and weight reductions thereof. With at least one optical member having the same optical action or function with respect to each light beam, interposed between the bending means and the single image pickup device, further size and weight reductions are achievable with a much more improved performance.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENT

One embodiment of the stereo imager according to the invention is now explained.

Figure 1A:
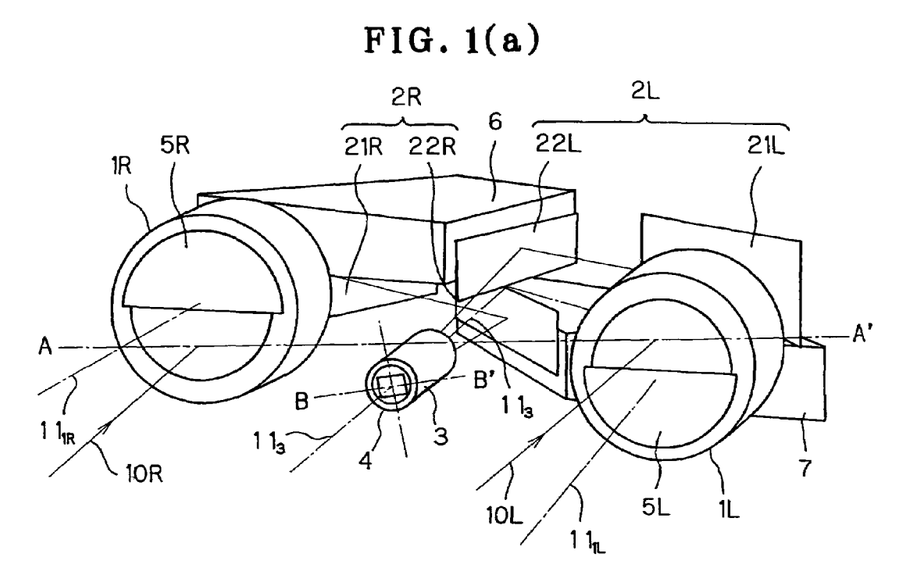
FIGS. 1(a) and 1(b) are schematically perspective view of exemplary constructions of the stereo imager according to one embodiment of the invention.
Figure 1B:
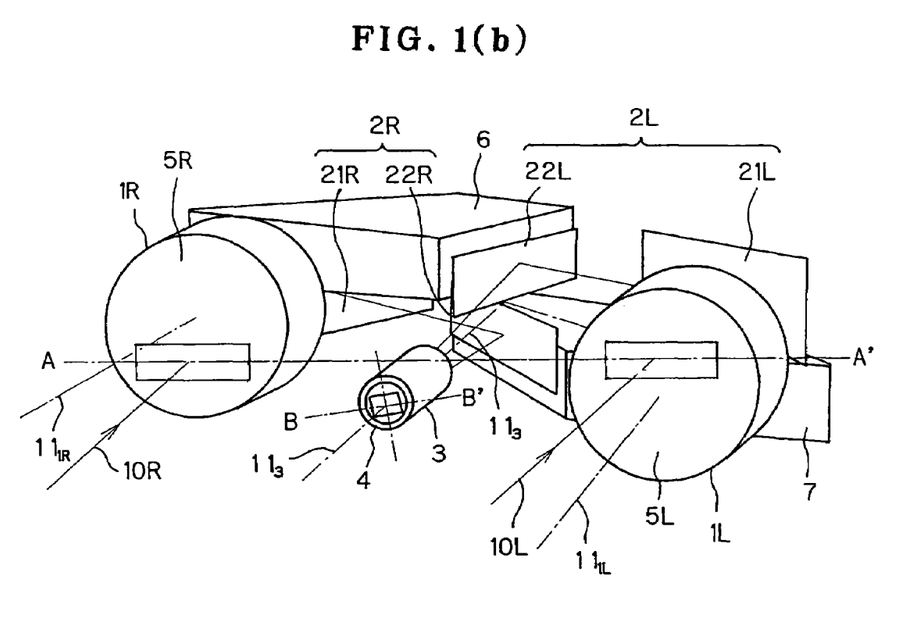

FIGS. 1(a) and 1(b) are schematically perspective views of a general construction of one embodiment of the stereo imager according to the invention. The constructions of FIGS. 1(a) and 1(b) are the same with the exception of the shapes of field masks 5L and 5R; they will be explained as the same stereo imager, unless otherwise specified.

In what follows, "L" and "R" are suffixed to numerical references to tell components or elements belonging to the left optical path from those belonging to the right optical path, unless otherwise stated.

The stereo imager is built up of, corresponding to left and right optical paths, a left objective lens group 1L and a right objective lens group 1R; a first reflecting surface 21L and a second reflecting surface 22L for reflecting light incident from the objective lens group 1L thereon in this order, and a first reflecting surface 21R and a second reflecting surface 22R for reflecting light incident from the objective lens group 1R thereon in this order; a common optical member 3 that receives light reflected at the left and right second reflecting surfaces 22L and 22R; and a common, single image pickup device 4 that is located on the image plane side of the optical member 3.

Here the direction of light reflected at the first reflecting surface 21L, 21R and the second reflecting surface 22L, 22R is explained. As can be seen from FIGS. 1(a) and 1(b), the left first reflecting surface 21L bends an optical path for light incident from the left objective lens group 1L thereon at an angle of substantially 90° toward the right objective lens group 1R, and the second reflecting surface 22L bends the thus bent optical path at an angle of substantially 90° in a direction substantially parallel with an optical path that enters the left objective lens group 1L and in the opposite direction, entering light in the common optical member 3. Likewise, the right first reflecting surface 21R bends an optical path for light incident from the right objective lens group 1R thereon at an angle of substantially 90° toward the left objective lens group 1L, and the second reflecting surface 22R bends the thus bent optical path at an angle of generally 90° in a direction substantially parallel with an optical path that enters the right objective lens group 1R and in the opposite direction, entering light in the common optical member 3.

Therefore in the stereo imager, the common optical member 3 and the common image pickup device 4 can be interposed between the left and right objective lens groups 1L and 1R. Then, the left-and-right direction width is determined by a distance between the ends of the left and right objective lens groups 1L and 1R (i.e., the base line length plus the aperture of one objective lens group), the depth thickness with respect to a subject is determined by a distance between the front end surfaces of the objective lens groups 1L, 1R and the rear end surface of light-guidance optical systems 2L, 2R made up of the first reflecting surfaces 21L, 21R and the second reflecting surfaces 22L, 22R, and the height is substantially set at smaller than the aperture of the objective lens groups 1L, 1R)—this is because portions of the objective lens groups 1L, 1R other than their effective areas can be trimmed off, and is substantially determined by the range of a light beam passing through the optical member 3. It is thus possible to obtain a compact stereo imaging unit.

A left parallactic image of a binocular parallactic image, formed on the image pickup device 4 by light incident from the left objective lens group 1L on the optical member 3 by way of the first reflecting surface 21L and then the second reflecting surface 22L, is projected onto a lower half of a rectangular image pickup plane of the image pickup device 4 in an inverted fashion, and a right parallactic image of the binocular parallactic image, formed on the image pickup device 4 by light incident from the right objective lens group 1R on the optical member 3 by way of the first reflecting surface 21R and then the second reflecting surface 22R, is projected onto an upper half of the rectangular image pickup plane of the image pickup device 4 in an inverted fashion.

Here the parallactic direction of the whole optical system in the stereo imager is now explained. Given that left and right chief rays are indicated at 10L and 10R, that parallactic direction is defined by the direction of a straight line A-A' that connects points of incidence of the left and right chief rays 10L, 10R on the entrance lens surfaces of the left and right objective lens groups 1L, 1R or the field masks 5L, 5R, and the parallactic direction of the parallactic image projected onto the image pickup device 4 is defined by the direction of a straight line B-B' parallel with the rectangular sides of the image pickup device 4. As can be seen from FIGS. 1(a) and 1(b), therefore, the parallactic direction A-A' of the whole optical system in the stereo imager is not parallel with the parallactic direction B-B' of the parallactic image projected onto the image pickup device 4; the parallectic direction B-B' is inclined with respect to the parallactic direction A-A'. This is because the first reflecting surfaces 21L, 21R and the second reflecting surfaces 22L, 22R are inclined biaxially rather than around a simple axis orthogonal to the same plane, so that the image of the subject projected onto the image pickup device 4 rotates. Here, the left and right chief rays 10L and 10R are defined by the center rays of light beams arriving at the centers of the left and right parallactic images formed on the image pickup device 4, respectively, by light incident from the objective lens groups 1L and 1R on the optical member 3 by way of the first reflecting surfaces 21L and 21R, and then the second reflecting surfaces 22L and 22R.

Here, the stereo imaging optical system in this embodiment is briefly explained. The left and right chief rays 10L and 10R are defined as mentioned above. On the other hand, the left objective lens group 1L has an optical axis (a center axis or axis of rotation) $11_{1L}$, the right objective lens group 1R has an optical axis (a center axis or axis of rotation) $11_{1R}$, and the optical member 3 has one optical axis (a center axis or axis of rotation) $11_3$. Given that an optical path at the first reflecting surfaces 21L, 21R and the second reflecting surfaces 22L, 22R is taken apart to take the left and right optical systems (lens systems) as being each one lens system, the optical axis $11_{1L}$ of the left objective lens group 1L and the optical axis $11_3$ of the optical member 3 are lined up into one optical axis, and the optical axis $11_{1R}$ of the right objective lens group 1R and the optical axis $11_3$ of the optical member 3 are lined up into one optical axis. Left and right light beams from the same subject enter the left and right objective lens groups 1L and 1R along the left and right chief rays 10L and 10R, respectively, forming left and right parallactic images on the lower and upper halves of the rectangular image pickup plane of the image pickup device 4 in an inverted fashion.

It is here noted that the chief rays 10L and 10R incident on the left and right objective lens groups 1L and 1R are not in alignment with the optical axes $11_{1L}$ and $11_{1R}$ thereof; the left incident chief ray 10L makes an upward angle with the left optical axis $11_{1L}$ and the right incident chief ray 10R makes a downward angle with the right optical axis $11_{1R}$. However, it is noted that in order to form the left and right parallactic images, the chief rays 10L and 10R incident on the left and right objective lens groups 1L and 1R make an internal angle depending on a subject distance while they are parallel with each other or lie in much the same plane, and so the optical axes $11_{1L}$ and $11_{1R}$ of the left and right objective lens groups 1L and 1R are mutually twisted into 180° rotational symmetry with respect to the optical axis $11_3$ of the optical member 3.

On the entrance sides of the left and right objective lens groups 1L and 1R, the field masks 5L and 5R are located to transmit image-formation light beams with centers on the chief rays 10L and 10R, respectively, and limit unnecessary light. In FIG. 1(a), a relatively simple field mask 5L is provided to cover a substantially lower half of the left objective lens group 1L and a similar field mask 5R is provided to cover a substantially upper half of the right objective lens group 1R, and in FIG. 1(b), an oblong, rectangular field mask 5L is provided to cover a substantially lower half of the left objective lens group 1L thereby limiting a parallactic image formed on the image pickup device 4 to a horizontally long, rectangular shape and a similar field mask 5R is provided to cover a substantially upper half of the right objective lens group 1R thereby limiting a parallactic image formed on the image pickup device 4 to a horizontally long, rectangular shape.

The first reflecting surfaces 21L and 21R are provided in such a size and shape so as not to limit effective light beams transmitting through the objective lens groups 1L and 1R, and inclined at an angle of 45° in the horizontal direction and at an angle of a few degrees toward the image pickup device 4 in the vertical direction, so that light beams reflected thereat are incident on the second reflecting surfaces 22L and 22R. The second reflecting surfaces 22L and 22R are inclined at an angle of substantially 90° in the horizontal direction and at a minute angle toward the image pickup device in the vertical direction, so that light beams reflected thereat are incident on the optical member 3. Referring to the second reflecting surfaces 22L and 22R as shown in FIGS. 1(a) and 1(b), they are positioned such that the upper, left second reflecting surface 22L and the lower, right second reflecting surface 22R cross each other as viewed from the vertical direction, so that light beams coming from the left-and-right direction are polarized in such a way as to enter the optical member 3 from the vertical direction.

The light beams limited by the field masks 5L and 5R pass through low-pass filters, not shown, and then enter the image-formation lens group 3, thereby forming the respective parallactic images on the associated lower and upper half areas of the image pickup device 4. Through the action of the field masks 5L and 5R, the upper and lower parallactic images are formed on the image pickup device 4 in a parallel, separate fashion without overlapping.

It is here important that a pair of the same components be located at left and right positions of 180° rotational symmetry about the optical axis $11_3$ of the optical member 3. More specifically, a pair of the same objective lens groups 1L and 1R as well as a pair of the same light-guide optical systems 2L and 2R should be located at left and right positions of 180° rotational symmetry about the optical axis $11_3$ of the optical member 3.

It is here noted that when the optical member 3 comprises a lens element such as an image-formation lens, a zoom lens and a focusing lens, the axis $11_3$ may be referred to as the optical axis of the optical member 3.

It is also noted that when the optical member 3 has an image-formation action, it is acceptable to use for it a stop member where the second reflecting surface 22L, 22R forms an exit pupil.

In FIGS. 1(b) and 1(b), it is noted that reference numerals 6 and 7 stand for upper and lower spaces for receiving circuit components in the stereo imager.

Figure 2:
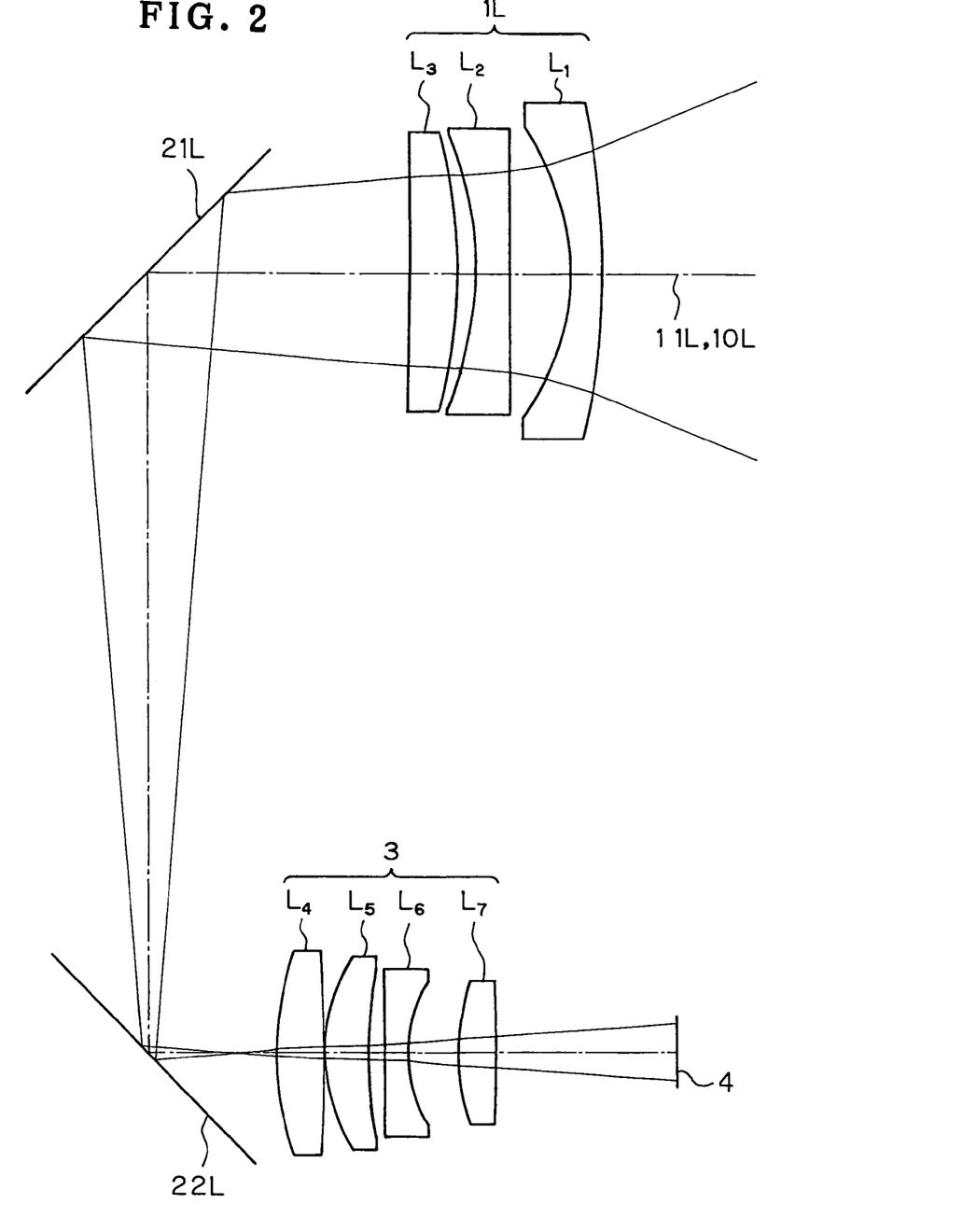
FIG. 2 is illustrative of one exemplary lens layout of the left optical system in the stereo imager according to the embodiment of FIG. 1.

FIG. 2 is illustrative of one example of the lens layout of the left optical system in such a stereo imager. That left optical system is built up of a negative objective lens 1L consisting of independent lens elements and an image-formation lens that serves as a common optical member 3.

Figure 3:
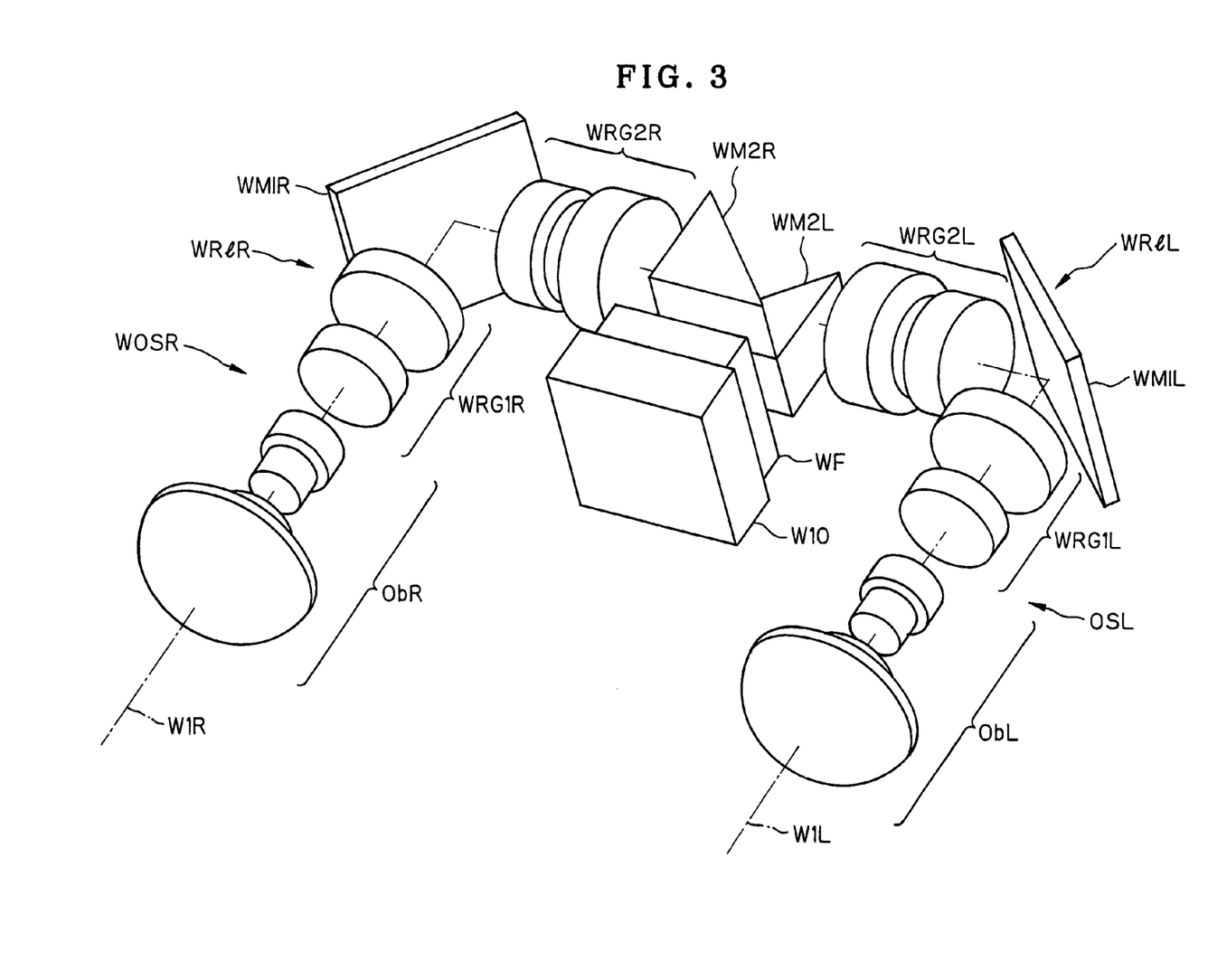
FIG. 3 is a schematically perspective view of one embodiment of the stereo imager constructed using superwide-angle lens optical systems.

FIG. 3 is a schematically perspective view of a stereo imager constructed using two superwide-angle optical systems.

In FIG. 3, a superwide-angle lens optical system for a right optical path and a superwide-angle lens optical system for a left optical path are designated by OSR and OSL, respectively, and W1R and W1L stand for the optical axes of OSR and OSL, respectively. To tell right from left, "R" and "L" are affixed to components that form the superwide-angle lens optical systems OSR and OSL.

The stereo imager further comprises two objective lens groups ObR and ObL that have entrance surfaces that face associated subject sides. Specifically, the objective lens group ObR, ObL in each superwide-angle lens optical system OSR, OSL is directed toward an associated subject side, with a relay lens group WR1R, WR1L provided in association with the objective lens group ObR, ObL.

The optical axes W1R, W1L of the superwide-angle lens optical systems OSR, OSL are bent by reflecting mirrors WM1R, WM1L in such a way as to come close mutually parallel from opposite sides. Given that a lateral direction is defined by the direction of the thus bent optical axis W1R, W1L, the optical axes W1R, W1L are then bent by longitudinally stacked reflecting prisms WM2R, WM2L in such a way as to run in the same direction while they are mutually parallel and longitudinally in alignment. In this embodiment, one common filter WF is provided for both optical systems OSR and OSL, as shown in FIG. 3.

Figure 4:
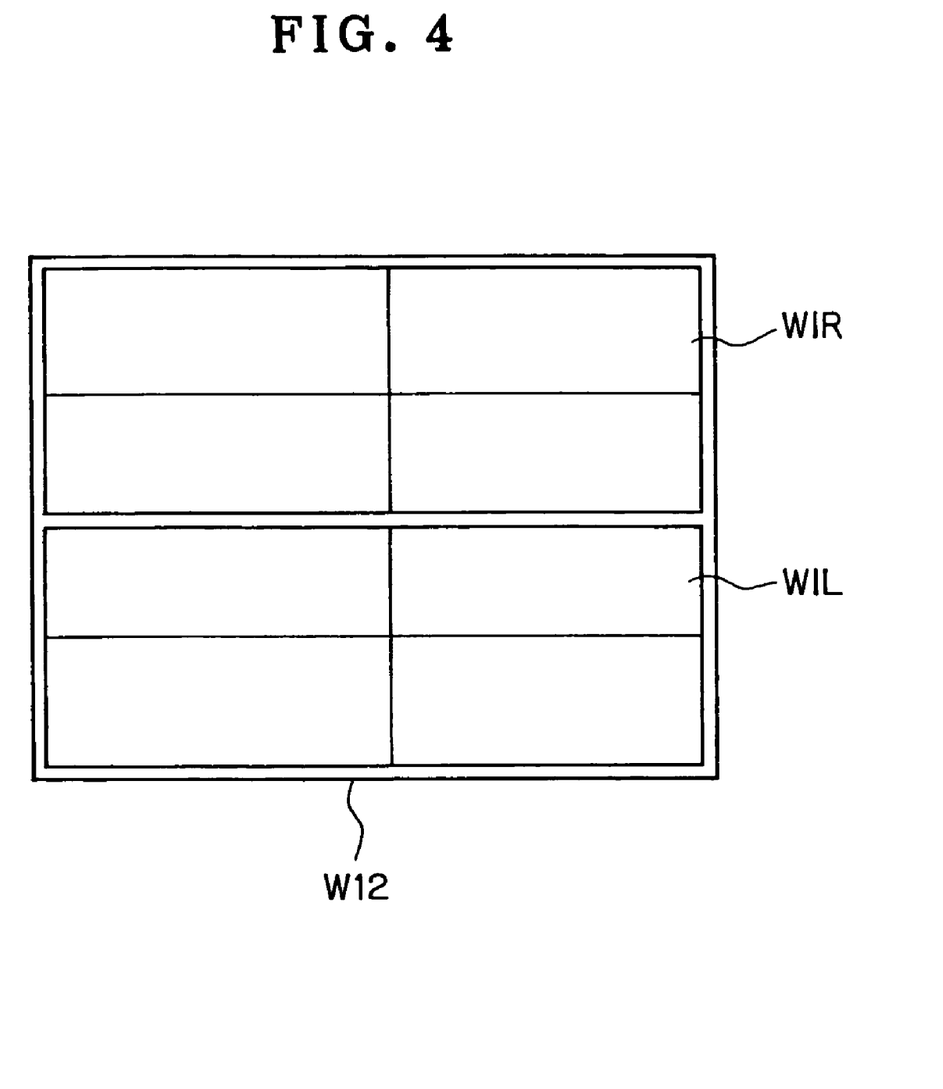
FIG. 4 is a front view of the image pickup plane of the stereo imager of FIG. 3 and the right and left image planes formed thereon.

In this embodiment, the long sides of such a rectangular image pickup plane W12, as shown in FIG. 4, of an image pickup device W10 are positioned in the longitudinal direction in such a way that an image plane WIR for the right optical path formed by the superwide-angle optical system OSR and an image plane WIL for the left optical path formed by the superwide-angle lens optical system OSL, both having mutual parallaxes, are formed on that image pickup plane W12 longitudinally in alignment. Thus, the optical axes W1R, W1L strike from the vertically stacked reflecting prisms WM2R, WM2L vertically on the image pickup plane W12.

With such arrangement, a wide field is assured in both the lateral and longitudinal directions even when the single image pickup device W10 is used.

Such optical system arrangements are well fit for the optical systems in onboard cameras needed for looking ahead and aside or the like, especially those onboard cameras and surveillance cameras for looking behind.

As the optical path is taken part, the optical axis W1R, W1L of the superwide-angle lens optical system OSR, OSL takes on a straight line, and refracting surfaces in the optical system contributing to taking are all in a rotationally symmetric form with the center on the optical axis W1R, W1L. The optical axis W1R, W1L of the optical system OSR, OSL is bent by reflecting mirrors WM1R/WM2R, WM1L/WM2L in the same plane. The planes that include the optical axes W1R and W1L are displaced parallel and longitudinally in alignment corresponding to the amount of displacement of the images formed on the image pickup plane W12.

Figure 5:
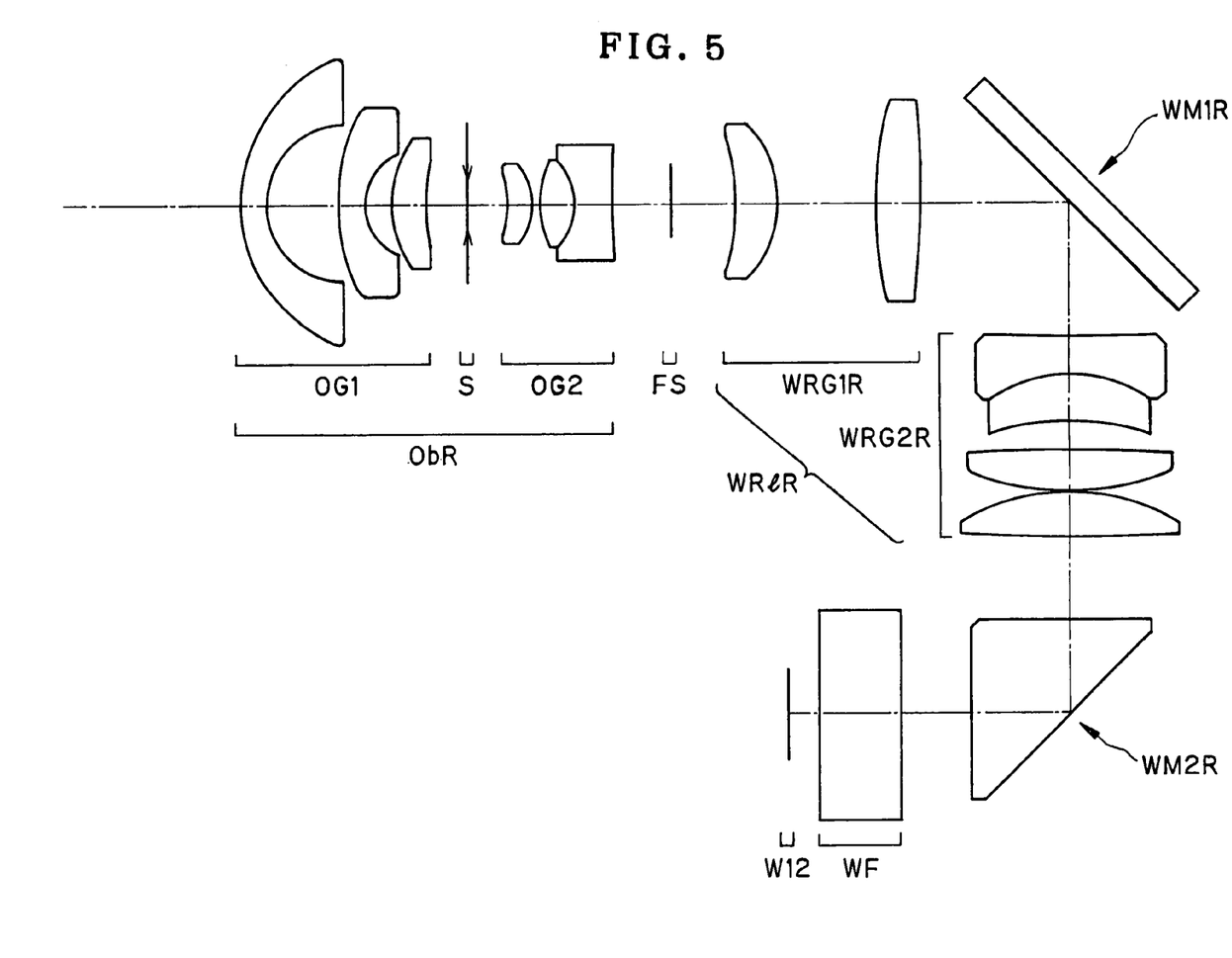
FIG. 5 is illustrative of the layout of the right optical system in the arrangement of FIG. 3.

Then, each optical axis W1R, W1L is bent by the reflecting prism WM2R, WM2L positioned just before the image pickup plane W12 at a right angle in the horizontal direction (that is the short-side direction or lateral direction of the image pickup plane W12), and bent a further 90° by the reflecting mirror WM1R, WM1L in a relay lens group WR1R, WR1L, so that the entrance surface can face the subject. Consequently, the optical system OSR, OSL is positioned such that the optical axis W1R, W1L takes on a "⊐" form (that allows the light beam to be reflected 90° twice in the same direction in the same plane), as viewed from above. FIG. 5 is illustrative of the layout of the right optical system in this embodiment. It is here noted that the objective lens group ObR comprises a front subgroup OG1 of negative refracting power and a rear subgroup OG2 of positive refracting power, with an aperture stop S interposed between them, and a field stop (field frame) FS is located on the image plane of the superwide-angle lens optical system OSR.

With such arrangement as described above wherein parallactic right and left images are formed on the single image pickup device W10, the whole construction of the stereo imager can be made compact while assuring a wide field of view.

The field stop (field frame) FS could be configured such that there is a slight overlap of parallactic images projected onto the image pickup plane W12. That slight overlap enables information about both images to be electrically compared thereby learning where an image comes from. Thus, if two or more images are taken while they are overlapping, it is then possible to capture more information.

With the above arrangement, it is possible to obtain parallactic images having an angle of view of nearly 120° in the horizontal direction and 90° in the vertical direction substantially over the whole field-of-view range.

Referring again to FIG. 3, the filter WF may comprise an ND filter (light-quantity control filter) or, alternatively, a filter group comprising a low-pass filter and an ND filter as well as an infrared cut filter or the like. It is also acceptable to use an element having electrically variable densities (e.g., an electro-optical element) instead of the ND filter.

Figure 6:
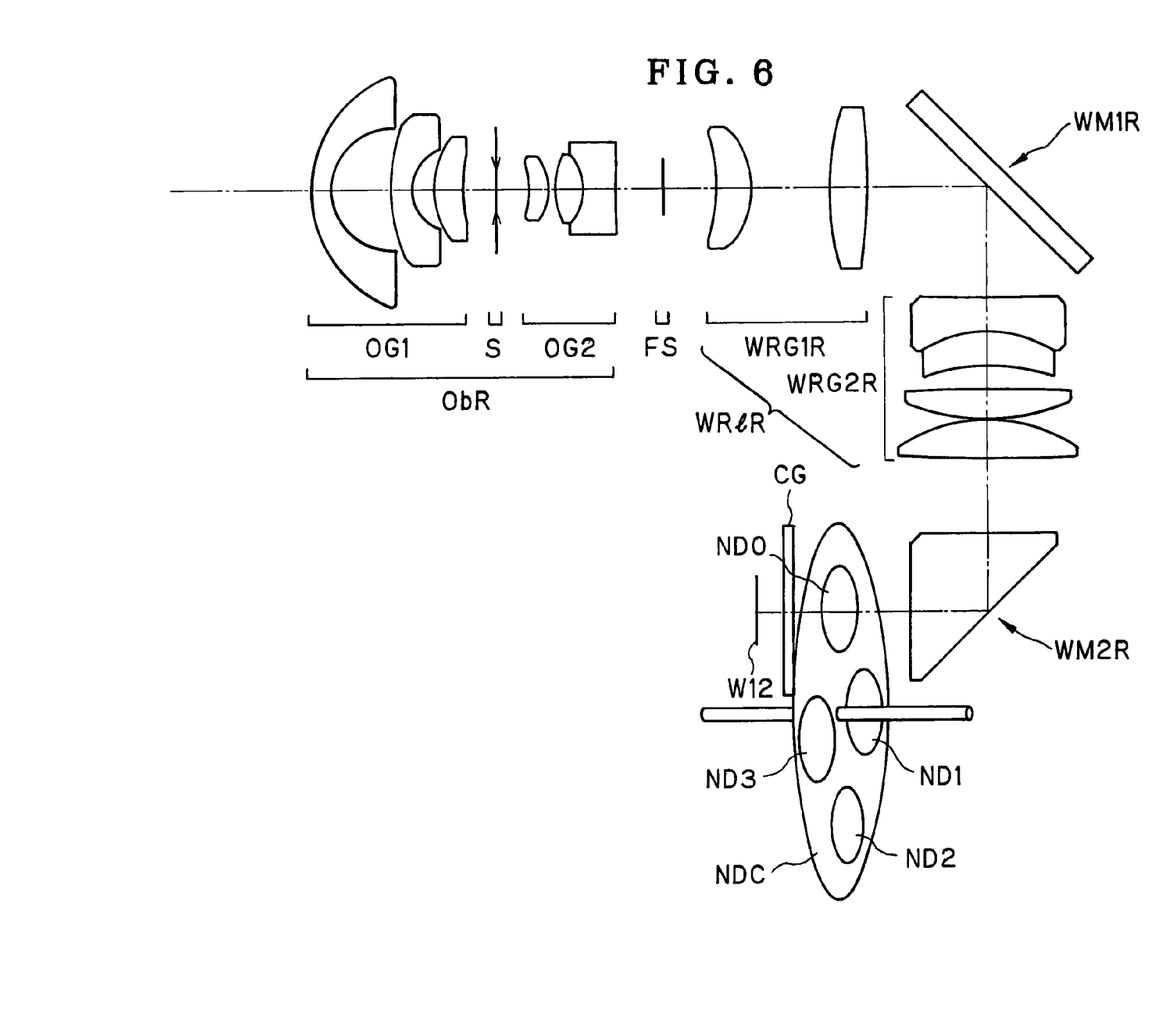
FIG. 6 is illustrative in schematic of the right optical system in the exemplary arrangement of FIG. 3, in which a variable ND filer is located as the common optical member.

FIG. 6 is a schematic view of the right optical system in one specific arrangement of FIG. 3, wherein as the common optical member interposed between the reflecting prisms WM2R and WM2L in both the optical systems and the common image pickup plane W12, there is provided a rotary disc NDC with ND filters ND0, ND1, ND2 and ND3 having different densities located in diametrical directions for insertion in, or deinsertion from, a common optical path. By rotation of the rotary disc NDC, any one of the ND filter ND0, ND1, ND2 and ND3 with varying densities is selectively inserted in, or deinserted from, the optical path. It is here noted that a plane-parallel plate CG placed just before the image pickup plane W12 is a cover glass.

Figure 7:
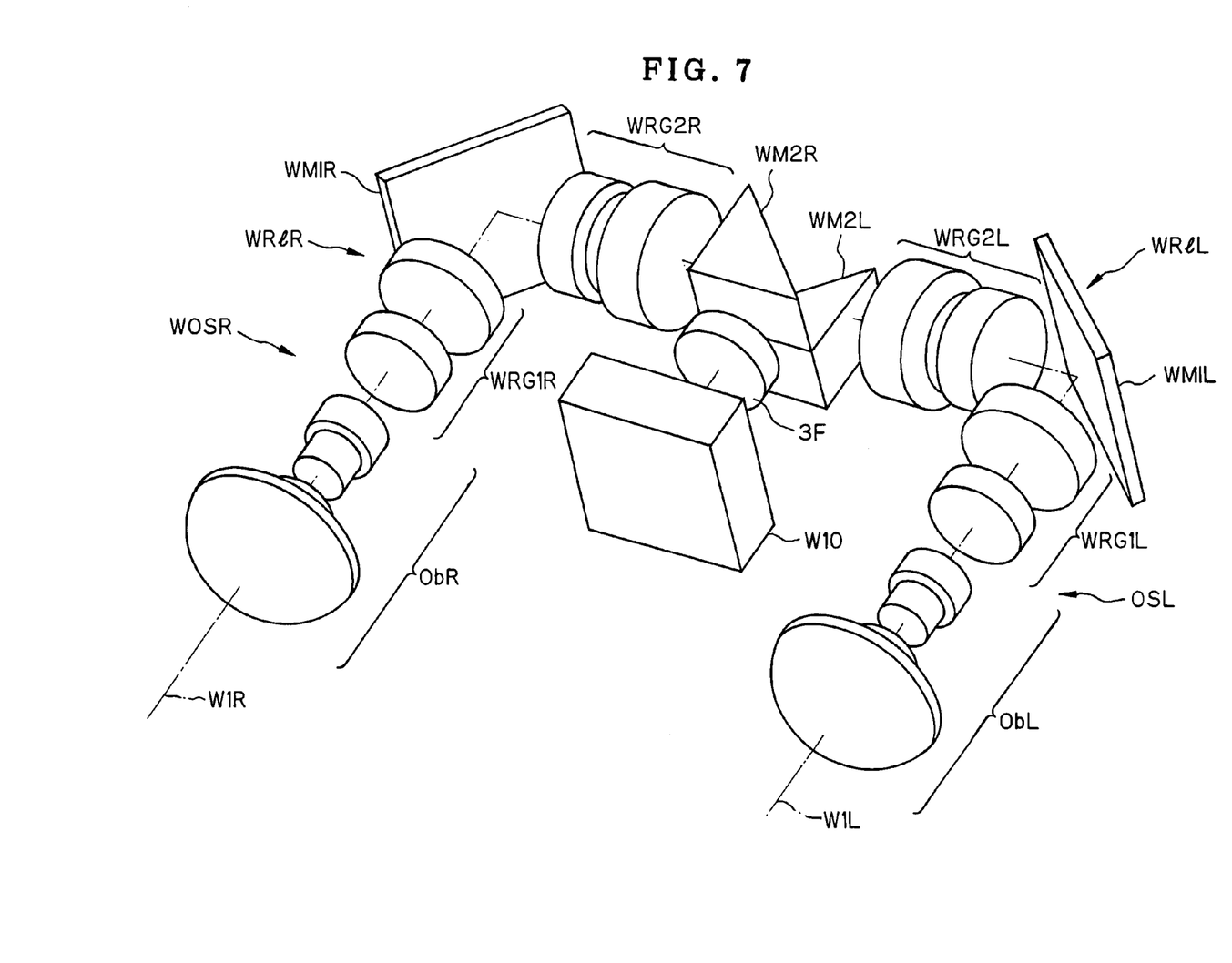
FIG. 7 is a schematically perspective view of the exemplary arrangement of FIG. 3, in which a focusing lens group is located as the common optical member.
Figure 8:
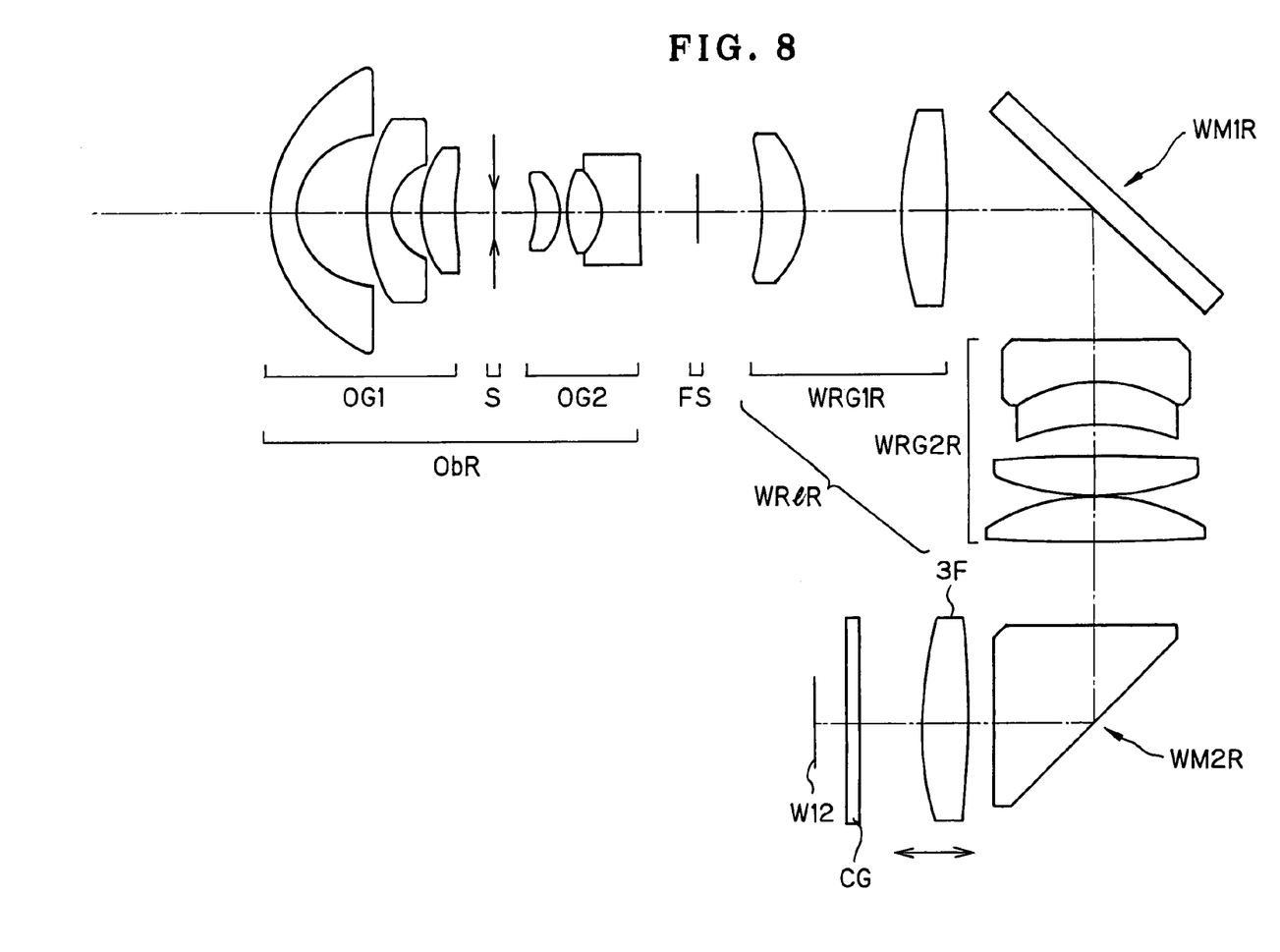
FIG. 8 is a view of FIG. 7 similar to FIG. 5.

FIGS. 7 and 8 are similar to FIGS. 3 and 5, showing another specific embodiment of FIG. 3, wherein as a common optical member interposed between the reflecting prisms WM2R and WM2L in both the optical systems and the common image pickup plane 12, there is provided a focusing lens element group 3F, wherein focusing is carried out by axial movement of the lens element group 3F.

Figure 9:
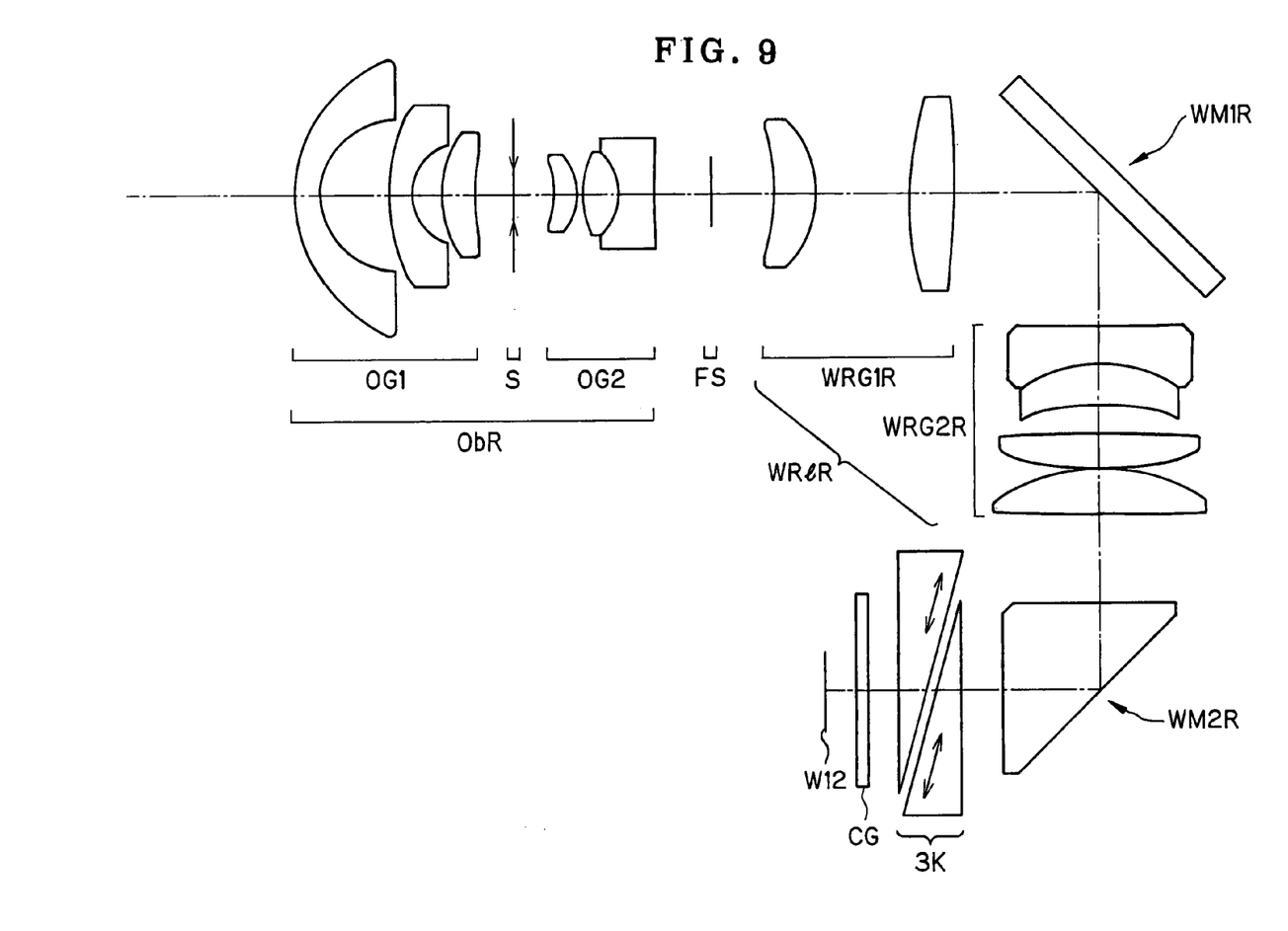
FIG. 9 is illustrative in schematic of the exemplary arrangement of FIG. 3, in which a variable optical path length means having a variable axial thickness is located as the common optical member.

FIG. 9 is similar to FIG. 5, showing yet another specific embodiment of FIG. 3, wherein as a common optical member interposed between the reflecting prisms WM2R and WM2L in both the optical systems and the common image pickup plane W12, there is provided a variable optical path length means 3K comprising a set of wedge-like prisms having an axially variable thickness, and focusing is carried out by use of that means 3K. More specifically, focusing is carried out by moving one set of wedge-like prisms in a spaced-away direction to change the thickness of a plane-parallel plate composed of a transparent medium having a refractive index of greater than 1, thereby controlling the length of the optical path.

Figure 10:
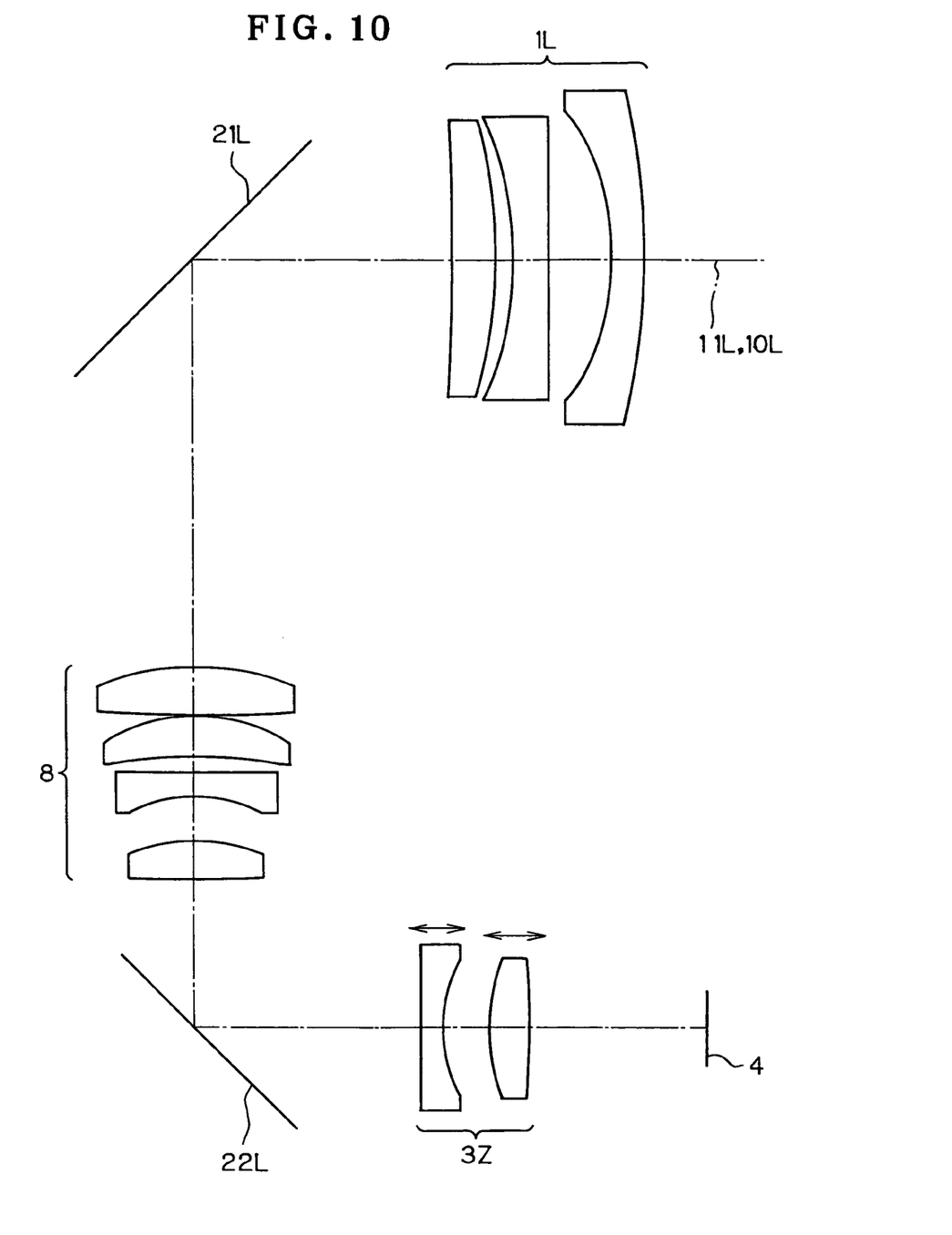
FIG. 10 is a view, similar to FIG. 2, of the lens layout of the left optical system in another stereo imager.

FIG. 10 is similar to FIG. 2, showing the lens layout of the left optical system in another stereo imager. This stereo imager comprises left and right objective lens groups 1L and 1R for the left and right optical paths, first reflecting surfaces 21L and 21R for reflecting light incident from the objective lens groups 1L and 1R, relay lens groups 8L and 8R for relaying left and right parallactic images formed through the objective lens groups 1L and 1R to a common single image pickup device 4, second reflecting surfaces 22L and 22R for reflecting light incident from the relay lens groups 8L and 8R, a common zoom lens group 3Z for receiving light reflected at the left and right second reflecting surfaces 22L and 22R, and the common single image pickup device 4 located on the image plane side of the zoom lens group 3Z, all arranged as shown in FIG. 1. The zoom lens group 3Z comprises a negative lens and a positive lens commonly to the left and right optical paths. Zooming is carried out by changing the spacing between those lenses.

I claim:

1. A stereo imager comprising a single image pickup device and a stereo imaging optical system including a bending member for bending a parallactic light beam from a subject and adapted to form on said single image pickup device at least two, mutually parallactic images in a left-and-right direction, wherein:

said stereo imaging optical system includes left and right objective lenses having an identical shape and corresponding to said two parallactic images, and a single optical member located in front of said single image pickup device, wherein said optical member receives concurrently incident light beams from the same subject forming said at least two parallactic images via said left and right objective lenses, and has an identical optical action or function on each light beam, and a chief light ray of light beams incident from the same subject on said optical member via said left and right objective lenses are incident on said left and right objective lenses in such a way as to form an angle with respect to each of the respective optical axes of said left and right objective lenses, and each of said light beams enters said optical member and leaves said optical member for projection onto the upper and lower halves of a rectangular imaging plane, forming a parallactic image.

2. The stereo imager according to claim 1, wherein said stereo imaging optical system includes a first entrance window and a second entrance window juxtaposed in a right-and-left direction with entrances surfaces thereof facing a subject side, and comprises, in order from said first entrance window, an objective lens group having positive refracting power, a primary image-formation plane formed by said objective lens group and a relay lens group having positive refracting power and, in order from said second entrance window, an objective lens group having positive refracting power, a primary image-formation plane formed by said objective lens group and a relay lens group having positive refracting power, wherein said optical member is interposed between a part of said relay lens groups and said single image pickup device.

3. The stereo imager according to claim 1, wherein said optical member comprises a positive lens group.

4. The stereo imager according to claim 1, wherein said optical member comprises a light-quantity control filter.

5. The stereo imager according to claim 1, said optical member comprises an aperture stop.

6. The stereo imager according to claim 5, which further comprises a positive lens group interposed between said aperture stop and said image pickup device.

7. The stereo imager according to claim 1, wherein said optical member is a focusing member.

8. The stereo imager according to claim 1, wherein said optical member is a zooming member.

9. A stereo imager comprising a single image pickup device and a stereo imaging optical system adapted to form on said single image pickup device at least two, mutually parallactic images in a left-and-right direction, wherein:

said stereo imaging optical system includes left and right objective lenses having an identical shape and corresponding to said two parallactic images, and a single optical member located in front of said single image pickup device;

wherein said optical member receives concurrently incident light beams from the same subject forming said at least two parallactic images via said left and right objective lenses, and has an identical optical action or function on each light beam, so that state changes are induced in said imaging optical system by the same optical action or function, and a chief light ray of light beams incident from the same subject on said optical member via said left and right objective lenses are incident on said left and right objective lenses in such a way as to form an angle with respect to each of the respective optical axes of said left and right objective lenses, and each of said light beams enters said optical member and leaves said optical member for projection onto the upper and lower halves of a rectangular imaging plane, forming a parallactic image.

10. The stereo imager according to claim 9, wherein said stereo imaging optical system includes a first entrance window and a second entrance window juxtaposed in a right-and-left direction with entrances surfaces thereof facing a subject side, and comprises, in order from said first entrance window, an objective lens group having positive refracting power, a primary image-formation plane formed by said objective lens group and a relay lens group having positive refracting power and, in order from said second entrance window, an objective lens group having positive refracting power, a primary image-formation plane formed by said objective lens group and a relay lens group having positive refracting power, wherein at least a part of said relay lens groups having positive refracting power is provided as a common optical system.

11. The stereo imager according to claim 9, wherein said stereo imaging optical system comprises:

an image-formation lens group of positive refracting power, on which said light beams forming at least two parallactic images are incident and which has only one optical axis, a first objective lens group and a second objective lens group, each of negative refracting power, which are juxtaposed at a spacing in a parallactic direction with entrance surfaces thereof facing a subject side, and a first light-guidance optical system including a 1-1st reflecting surface and a 1-2nd reflecting surface for guiding a light beam incident from the subject through said first objective lens group to said image-formation lens group, and a second light-guidance optical system including a 2-1st reflecting surface and a 2-2nd reflecting surface for guiding a light beam incident from the subject through said second objective lens group to said image-formation lens group, wherein said optical member is formed by said image-formation lens group of positive refracting power.

* * * * *

UNITED STATES PATENT AND TRADEMARK OFFICE
CERTIFICATE OF CORRECTION

PATENT NO. : 7,606,485 B2 Page 1 of 1
APPLICATION NO. : 11/063603
DATED : October 20, 2009
INVENTOR(S) : Masahito Ohashi It is certified that error appears in the above-identified patent and that said Letters Patent is hereby corrected as shown below:

Title Page; On the face of the patent at (30), please insert the following:

--Foreign Application Priority Data
Feb. 25, 2004 (JP) ............................. 2004-049256--.

Signed and Sealed this

Second Day of February, 2010

David J. Kappos
*Director of the United States Patent and Trademark Office*